(12) United States Patent
Tanikawa et al.

(10) Patent No.: US 10,711,902 B2
(45) Date of Patent: Jul. 14, 2020

(54) FLOW DIVIDING VALVE

(71) Applicant: FUJIKIN INCORPORATED, Osaka-shi (JP)

(72) Inventors: Tsuyoshi Tanikawa, Osaka (JP); Keisuke Ishibashi, Osaka (JP); Tadayuki Yakushijin, Osaka (JP); Michio Yamaji, Osaka (JP); Ryousuke Dohi, Osaka (JP); Yoshinori Shimomura, Osaka (JP); Takashi Funakoshi, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 8 days.

(21) Appl. No.: 16/086,421

(22) PCT Filed: Jan. 25, 2018

(86) PCT No.: PCT/JP2018/002217
§ 371 (c)(1),
(2) Date: Sep. 19, 2018

(87) PCT Pub. No.: WO2018/143040
PCT Pub. Date: Aug. 9, 2018

(65) Prior Publication Data
US 2019/0040965 A1    Feb. 7, 2019

(30) Foreign Application Priority Data

Jan. 31, 2017 (JP) .................................. 2017-015955

(51) Int. Cl.
*F16K 11/048* (2006.01)
*F16K 31/122* (2006.01)
(Continued)

(52) U.S. Cl.
CPC .............. *F16K 11/048* (2013.01); *F16K 1/36* (2013.01); *F16K 1/38* (2013.01); *F16K 31/1221* (2013.01);
(Continued)

(58) Field of Classification Search
CPC .......... F16K 11/048; F16K 41/10; F16K 1/38; F16K 31/1221; F16K 1/36; F16K 41/103;
(Continued)

(56) References Cited

U.S. PATENT DOCUMENTS 2,118,858 A * 5/1938 Newhall ............... F16K 11/044
137/625.66
2,703,106 A * 3/1955 Borgerd ............... F25B 41/046
137/625.29
(Continued)

FOREIGN PATENT DOCUMENTS

CN       101097000 A    1/2008
CN       204226668 U    3/2015
(Continued)

OTHER PUBLICATIONS

Office Action dated May 22, 2019, issued for the corresponding CN patent application No. 201880001361.4 and English translation thereof.
(Continued)

*Primary Examiner* — John Bastianelli
(74) *Attorney, Agent, or Firm* — Locke Lord LLP (57) ABSTRACT

A valve element movement mechanism includes: a first valve stem having one end portion to which a first valve element to close and open an area between one of the large diameter portion and the small diameter portion is fixed; a second valve stem having one end portion to which a second valve element to close and open an area between the other of the large diameter portions and the small diameter portion
(Continued)

is fixed; a first bellows having one end portion fixed to a first bellows flange and the other end portion fixed to the first valve element; a second bellows having one end portion fixed to a second bellows flange and the other end portion fixed to the second valve element; a frame disposed outside the main passage; and an actuator to move the frame in the directions in which valve elements are closed and opened.

7 Claims, 7 Drawing Sheets

(51) Int. Cl.
- *F16K 1/36* (2006.01)
- *F16K 41/10* (2006.01)
- *F16K 1/38* (2006.01)
- *F16K 3/02* (2006.01)

(52) U.S. Cl.
CPC ............ *F16K 41/10* (2013.01); *F16K 41/103* (2013.01); *F16K 3/0227* (2013.01); *Y10T 137/86895* (2015.04); *Y10T 137/87764* (2015.04)

(58) Field of Classification Search
CPC ...... F16K 3/0227; F16K 31/122; F16K 31/12; Y10T 137/87764; Y10T 137/86895
USPC ...... 251/120–122, 333, 129.2; 137/869, 871, 137/625.42, 625.5, 625.66
See application file for complete search history.

(56) References Cited

U.S. PATENT DOCUMENTS

| | | | | |
|---|---|---|---|---|
| 4,237,931 A * | 12/1980 | Rafaely | ................... | A01J 7/025 137/625.27 |
| 4,610,424 A * | 9/1986 | Koppers | ................... | F16K 1/36 251/121 |
| 4,630,645 A * | 12/1986 | Spa | ..................... | F16K 31/1221 137/625.6 |
| 4,711,269 A * | 12/1987 | Sule | .................... | F16K 31/0634 137/625.5 |
| 5,007,458 A * | 4/1991 | Marcus | ............... | F16K 31/0634 137/625.5 |
| 5,421,306 A * | 6/1995 | Talaski | ............... | F02M 37/0023 123/457 |
| 6,116,276 A * | 9/2000 | Grill | ................... | F15B 13/0405 137/596.17 |
| 6,772,993 B1 * | 8/2004 | Miller | ..................... | F16K 47/08 251/333 |
| 6,871,668 B2 * | 3/2005 | Moreno | ................ | F16K 11/048 137/329.04 |
| 8,528,598 B2 * | 9/2013 | Morgan | ............... | G05D 11/003 137/625.5 |
| 2003/0132413 A1 * | 7/2003 | Boecking | ............... | F02M 61/18 251/333 |
| 2008/0001110 A1 | 1/2008 | Nagai | | |
| 2014/0283546 A1 | 9/2014 | Wakisaka et al. | | |

FOREIGN PATENT DOCUMENTS

| | | |
|---|---|---|
| JP | 48-74621 A | 10/1973 |
| JP | 58-128579 A | 8/1983 |
| JP | 4805465 B2 | 11/2011 |
| JP | 2013-108647 A | 6/2013 |

OTHER PUBLICATIONS

International Search Report dated Mar. 6, 2018, issued for PCT/JP2018/002217.

Office Action dated Dec. 2, 2019, issued in the corresponding CN patent application No. 201880001361.4, English translation thereof and Search Report.

* cited by examiner

FLOW DIVIDING VALVE

TECHNICAL FIELD

The present invention relates to a flow dividing valve that causes a fluid flowing in through an inlet passage to flow out through two outlet passages.

BACKGROUND ART

A flow dividing valve that causes a fluid flowing in through an inlet passage to flow out through two outlet passages is used for temperature control or the like. Patent Literature 1 discloses such a flow dividing valve including: a body in which a main passage, an inlet passage that is in communication with the main passage, a first outlet passage that is in communication with the main passage, and a second outlet passage that is in communication with the main passage are formed; a first seat disposed at a portion of the main passage, the portion leading to the first outlet passage; a second seat disposed at a portion of the main passage, the portion leading to the second outlet passage; a first valve element that is brought into contact with and is separated from the first seat to close and open the portion that leads to the first outlet passage, respectively; a second valve element that is brought into contact with and is separated from the second seat to close and open the portion that leads to the second outlet passage, respectively; and
 a valve element movement mechanism that moves either one of the first valve element and the second valve element to an opening side and that moves the other of the first valve element and the second valve element to a closing side in an interlocked manner.

CITATION LIST

Patent Literature

Patent Literature 1: Japanese Patent No. 4805465

SUMMARY OF INVENTION

Technical Problem

Figure 11:
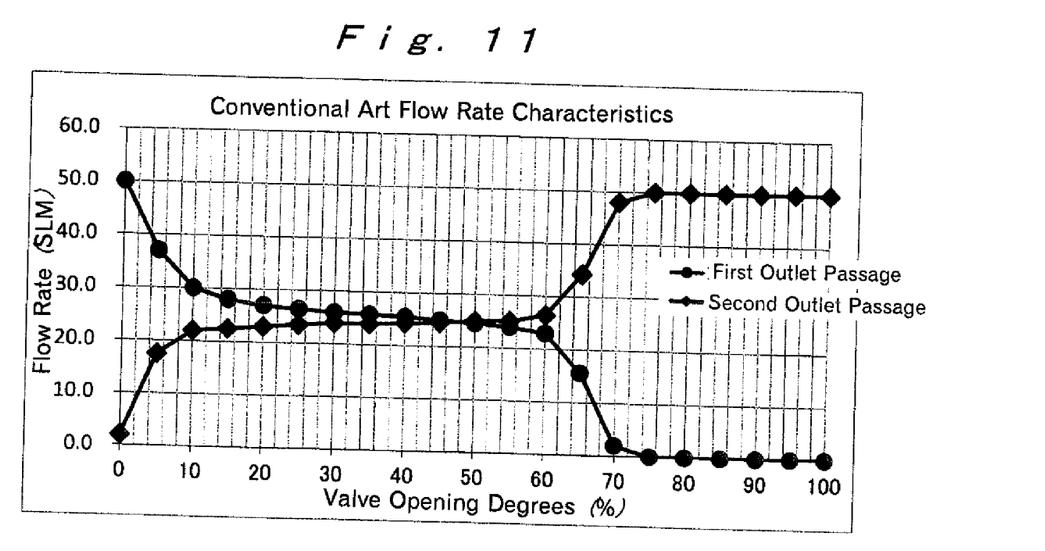
FIG. 11 shows flow rate characteristics of the conventional flow dividing valve.

FIG. 11 shows flow rate characteristics of a conventional flow dividing valve. According to the flow rate characteristics of the conventional example shown in FIG. 11, when the opening degree of a valve is in a region of 0 to 10% and in a region of 60 to 70%, the flow rate varies greatly, and when the opening degree of a valve is in a region of 10 to 60%, the flow rate varies slightly. Therefore, when the opening degree of a valve is in a region of 0 to 10% and in a region of 60 to 70%, control is difficult because even a little change in the opening degree of the valve causes a great change in the flow rate. In addition, when the opening degree of a valve is in a region of 10 to 60%, control is difficult because a change in the opening degree of the valve does not cause the flow rate to change according to the change in the opening degree of the valve. That is, the conventional flow dividing valve has had a problem that a stroke of the valve element is short, control accuracy is extremely low, and accordingly flow dividing accuracy is also low.

An object of the present invention is to provide a flow dividing valve that is excellent in accuracy of flow rate control by lengthening the stroke of the valve element.

A further object of the present invention is to provide a flow dividing valve that is excellent in accuracy of flow rate control over a wide range of the opening degree of from 0 to 100%.

Solution to Problem

The flow dividing valve in accordance with the first aspect of the present invention is a flow dividing valve including: a body in which a main passage, an inlet passage that is in communication with the main passage, a first outlet passage that is in communication with the main passage, and a second outlet passage that is in communication with the main passage, are formed; a first seat disposed at a portion of the main passage, the portion leading to the first outlet passage; a second seat disposed at a portion of the main passage, the portion leading to the second outlet passage; a first valve element that is brought into contact with and is separated from the first seat to close and open the portion that leads to the first outlet passage, respectively; a second valve element that is brought into contact with and is separated from the second seat to close and open the portion that leads to the second outlet passage, respectively; and a valve element movement mechanism that moves either one of the first valve element and the second valve element to an opening side and that moves the other of the first valve element and the second valve element to a closing side in an interlocked manner, wherein the main passage has two large diameter portions and a small diameter portion located between the large diameter portions, with the inlet passage being in communication with the small diameter portion, the first outlet passage being in communication with one of the large diameter portions, and the second outlet passage being in communication with the other of the large diameter portions, and the valve element movement mechanism comprises: a first valve stem that has one end portion to which the first valve element configured to close and open an area between the one of the large diameter portions and the small diameter portion of the main passage is fixed, and that extends along a direction in which the first valve element is closed and opened; a second valve stem that has one end portion to which the second valve element configured to close and open an area between the other of the large diameter portions and the small diameter portion of the main passage is fixed, and that extends along a direction in which the second valve element is closed and opened; a first bellows having one end portion that is fixed to a first bellows flange and the other end portion that is fixed to the first valve element; a second bellows having one end portion that is fixed to a second bellows flange and the other end portion that is fixed to the second valve element; a frame that is disposed outside the main passage and that is connected to the first valve stem and the second valve stem; and an actuator configured to move the frame in the directions in which the first valve element and the second valve element are closed and opened.

This flow dividing valve may be used for various application purposes, and in particular, may be suitably used for controlling temperature using a refrigerant as a fluid. To supply the refrigerant, a pump is used for example, thereby ensuring a constant flow rate. The flow is divided into two at a specified ratio, and either one of the divided flows is used for temperature control, whereby appropriate control is performed.

With the flow dividing valve in accordance with the first aspect of the present invention, the first seat is disposed between the large diameter portion at the one side and the small diameter portion of the main passage, the second seat that faces the first seat is disposed between the large diameter portion at the other side and the small diameter portion of the main passage, the valve stems integral with the valve elements that close the seats are connected to each other with the frame, and the two seats are operated in an interlocked manner such that one of the seats is moved in the closing direction while the other of the seats is moved in the opening direction, whereby good responsiveness and accurate control are achieved.

The actuator causes the frame to move along the main passage, so that the amounts of fluids flowing out through the outlet passages are controlled so as to be desired values. Here, because the bellows is used for the sealing structure instead of using a diaphragm, which is typically used, the amount of stroke of the valve element can be made larger whereby excellent accuracy for flow rate control is achieved.

Preferably, the actuator is a cylinder having a cylinder body and a cylinder rod, and the cylinder body is fixed to the body of the flow dividing valve via a spacer.

The spacer is provided for the purpose of keeping the cylinder body at a specified distance away from the body of the flow dividing valve. Such a spacer protects the drive mechanism of the cylinder body even when the temperature of the fluid inside the body of the flow dividing valve is within a range (for example, at low temperature of the order of −60° C.) to adversely affect the cylinder.

The first valve element has the same shape as the second valve element. This configuration ensures that the total flow rate does not vary depending on the opening degree of each valve elements Preferably, the first valve element and the second valve element each have a surface that is brought into contact with and is separated from the body, and the surface has a tapered shape. This configuration allows close control of flow rate.

The flow rate characteristics of the fluid that flows between the first valve element and the body and between the second valve element and the body are preferably linear flow characteristics. The linear flow characteristics produce the characteristics in which the opening degree is proportional to the flow rate. The characteristics ensure that the total flow rate does not vary depending on the opening degree of each valve element.

Preferably, the flow dividing valve includes a plate that has a through hole through which the first valve stem or the second valve stem is to be inserted and that causes the first bellows flange or the second bellows flange to be pressed against the body, and a seal member is provided between the plate, and the first valve stem or the second valve stem.

The seal members (for example, O-rings) provided between each plate and each valve element and between each plate and each bellows flange are not required to prevent the fluid inside the body from leaking out. But the seal members prevent an atmosphere from entering the body from the outside. Because the atmosphere is sealed at the time of assembly of the flow dividing valve and therefore an excessive atmosphere more than the sealed atmosphere is not contained in the body, providing the seal members prevents the occurrence of a problematic situation that the amount of water content that condenses or freezes due to the excessive atmosphere being cooled increases.

The flow dividing valve in accordance with the second aspect of the present invention is a flow dividing valve including: a body in which a main passage, an inlet passage that is in communication with the main passage, a first outlet passage that is in communication with the main passage, and a second outlet passage that is in communication with the main passage, are formed; a first seat disposed at a portion of the main passage, the portion leading to the first outlet passage, a second seat disposed at a portion of the main passage, the portion leading to the second outlet passage, a first valve element that is brought into contact with and is separated from the first seat to close and open the portion that leads to the first outlet passage, respectively, a second valve element that is brought into contact with and is separated from the second seat to close and open the portion that leads to the second outlet passage, respectively, and a valve element movement mechanism that moves either one of the first valve element and the second valve element to an opening side and that moves the other of the first valve element and the second valve element to a closing side in an interlocked manner, and the flow dividing valve is configured to be switchable among: a state of a 0% opening degree in which the position of the first valve element with respect to the first seat is at a fully open position and the position of the second valve element with respect to the second seat is at a fully closed position; a state of a 100% opening degree in which the position of the first valve element with respect to the first seat is at a fully closed position and the position of the second valve element with respect to the second seat is at a fully open position; and a state of an intermediate opening degree in which the position of the first valve element with respect to the first seat is at a required open position and the position of the second valve element with respect to the second seat is also at a required open position, wherein, regarding a sum of a Cv value on the side of the first outlet passage formed between the first seat and the first valve element and a Cv value on the side of the second outlet passage formed between the second seat and the second valve element, the sum in the state of the intermediate opening degree is not greater than the sum in the state of the 0% opening degree and is not greater than the sum in the state of the 100% opening degree.

With the flow dividing valve in accordance with the second aspect of the present invention, regarding the Cv values for the two outlet passages, the sum of the Cv values for both outlet passages at the time when the opening degree is changed from 0% to 100% is focused on. Because the sum of the Cv values for both outlet passages at the intermediate opening degree (the state in which the opening degree is 40%, 50%, or the like) is not greater than the sum of the Cv values for both outlet passages in the state of the 0% opening degree or in the state of the 100% opening degree, the flow rate characteristics is such that the opening degree is approximately proportional to the flow rate, whereby excellent accuracy of flow rate control is achieved over a wide range of the opening degree of 0 to 100%.

The Cv value may be replaced with an area of an opening. The characteristic portion of the flow dividing valve in accordance with the present invention may also be defined such that, regarding the sum of an area of an opening on the side of the first outlet passage formed between the first seat and the first valve element and an area of an opening on the side of the second outlet passage formed between the second seat and the second valve element, the sum of the areas of the openings for both outlet passages in the state of the intermediate opening degree is not greater than the sum of the areas of the openings for both outlet passages in the state of the 0% opening degree and in the state of the 100% opening degree.

Preferably, each valve element has a first tapered portion that has a specified cone angle and that is brought into contact with the corresponding seat when the valve element is fully closed, and a second tapered portion that has a cone angle smaller than that of the first tapered portion and that is contiguous with a distal end side of the first tapered portion.

With each valve element having such a shape, the area of the opening and the Cv value as described above may be obtained easily.

For example, in the case where, when a refrigerant is used as a fluid for temperature control, the flow rate changes greatly or changes merely slightly with respect to the amount of change in the opening degree, flow rate control is normally difficult. But, with the flow dividing valve in accordance with the second aspect of the present invention, such a problem is overcome.

Preferably, in the flow dividing valve in accordance with the second aspect of the present invention, the main passage has two large diameter portions and a small diameter portion located between the large diameter portions, with the inlet passage being in communication with the small diameter portion, the first outlet passage being in communication with one of the large diameter portions, and the second outlet passage being in communication with the other of the large diameter portions, and the valve element movement mechanism includes: a first valve stem that has one end portion to which the first valve element configured to close and open an area between the one of the large diameter portions and the small diameter portion of the main passage is fixed, and that extends along a direction in which the first valve element is closed and opened; a second valve stem that has one end portion to which the second valve element configured to close and open an area between the other of the large diameter portions and the small diameter portion of the main passage is fixed, and that extends along a direction in which the second valve element is closed and opened; a first bellows having one end portion that is fixed to a first bellows flange and the other end portion that is fixed to the first valve element; a second bellows having one end portion that is fixed to a second bellows flange and the other end portion that is fixed to the second valve element; a frame that is disposed outside the main passage and that is connected to the first valve stem and the second valve stem; and an actuator that is actuated with air and configured to move the frame in the directions in which the first valve element and the second valve element are closed and opened.

Such a configuration allows increasing the stroke amount of the valve element and improvement of the accuracy of flow rate control.

With the flow dividing valve in accordance with the second aspect of the present invention, even when it is combined with a conventional flow dividing valve in which the stroke amount of the valve element is relatively small, excellent accuracy of flow rate control over a wide range of the opening degree from 0 to 100% is achieved.

Advantageous Effects of Invention

In the flow dividing valve in accordance with the first aspect of the present invention, the valve elements that close the seats (provided between one of the large diameter portions and the small diameter portion of the main passage, and between the other of the large diameter portions and the small diameter portion of the main passage) at two locations and the valve stems integral with the valve elements are connected to each other with the frame, and the two seats are operated in an interlocked manner such that one of the seats is moved in the closing direction while the other of the seats is moved in the opening direction, whereby good responsiveness and accurate control are achieved. In addition, because the sealing structure is obtained by using the bellows, the stroke amount of the valve element can be made greater whereby excellent accuracy for flow rate control is achieved.

With the flow dividing valve in accordance with the second aspect of the present invention, the flow rate characteristics is such that the opening degree is approximately proportional to the flow rate, whereby excellent accuracy of flow rate control is achieved over a wide range of the opening degree of 0 to 100%.

REFERENCE SIGNS LIST

1: flow dividing valve
2: body
2*a*: first seat
2*b*: second seat
3: valve element movement mechanism
11: main passage
11*a*, 11*b*: large diameter portion
11*c*: small diameter portion
12: inlet passage
13: first outlet passage
14: second outlet passage
21: first valve element
21*b*: first tapered portion
21*c*: second tapered portion
22: first valve stem
23: second valve element
23*b*: first tapered portion
23*c*: second tapered portion
24: second valve stem
25: frame
26: cylinder (actuator)

28: first bellows
29: first bellows flange
32: second bellows
33: second bellows flange
72: first valve element
72b: tapered portion
73: second valve element
73b: tapered portion

DESCRIPTION OF EMBODIMENTS

Embodiments of the present invention will be described below with reference to the drawings. In the following description, left and right sides of FIGS. 1 and 2 are referred to as the left and right, respectively, and upper and lower sides of FIG. 2 are referred to as the upper and lower sides, respectively.

Embodiment 1

Figure 1:
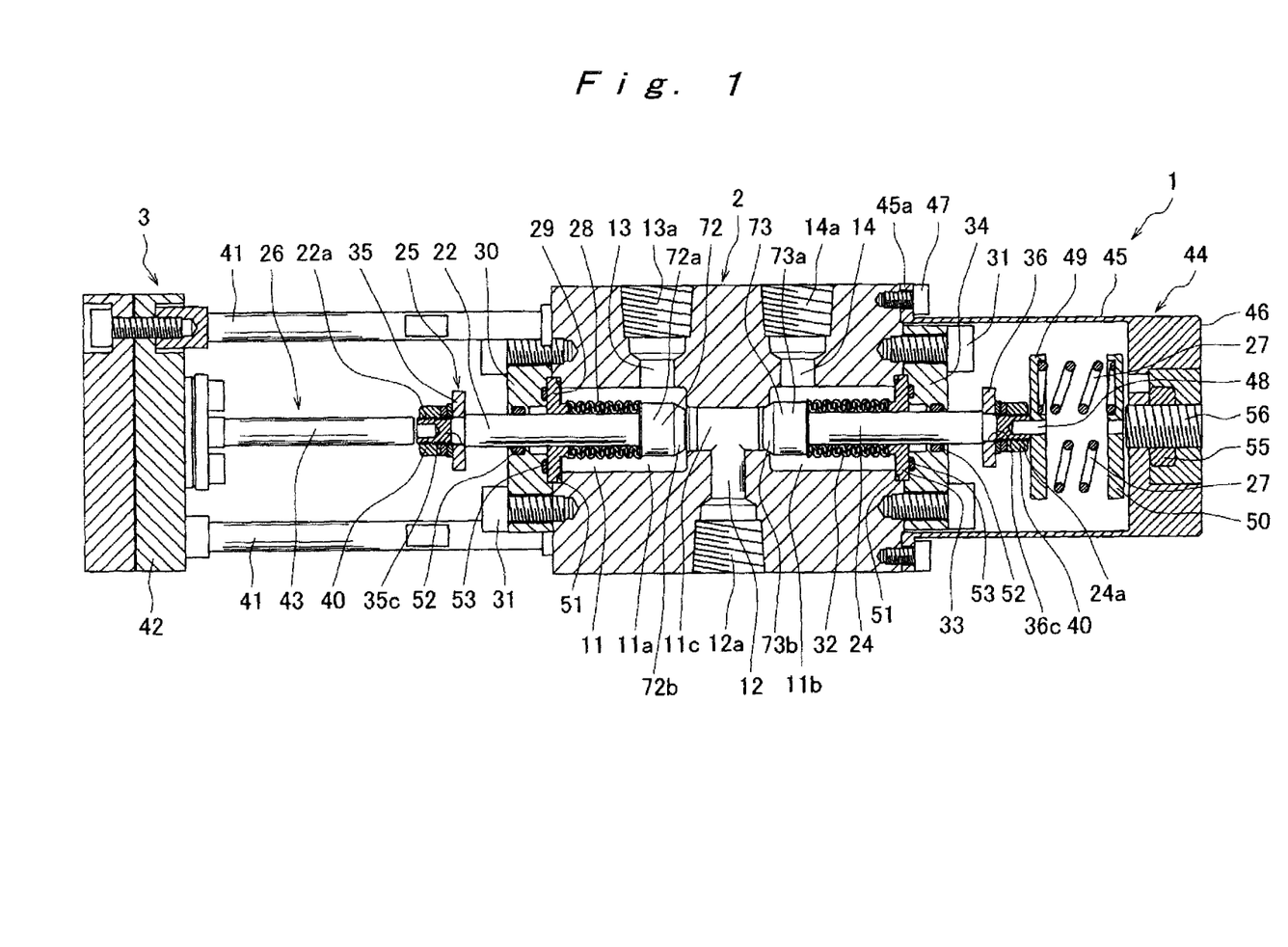
FIG. 1 is a longitudinal sectional view (partial cross-sectional view) showing a flow dividing valve in accordance with a first embodiment of the present invention, which shows a section of each passage that passes through the center thereof.
Figure 2:
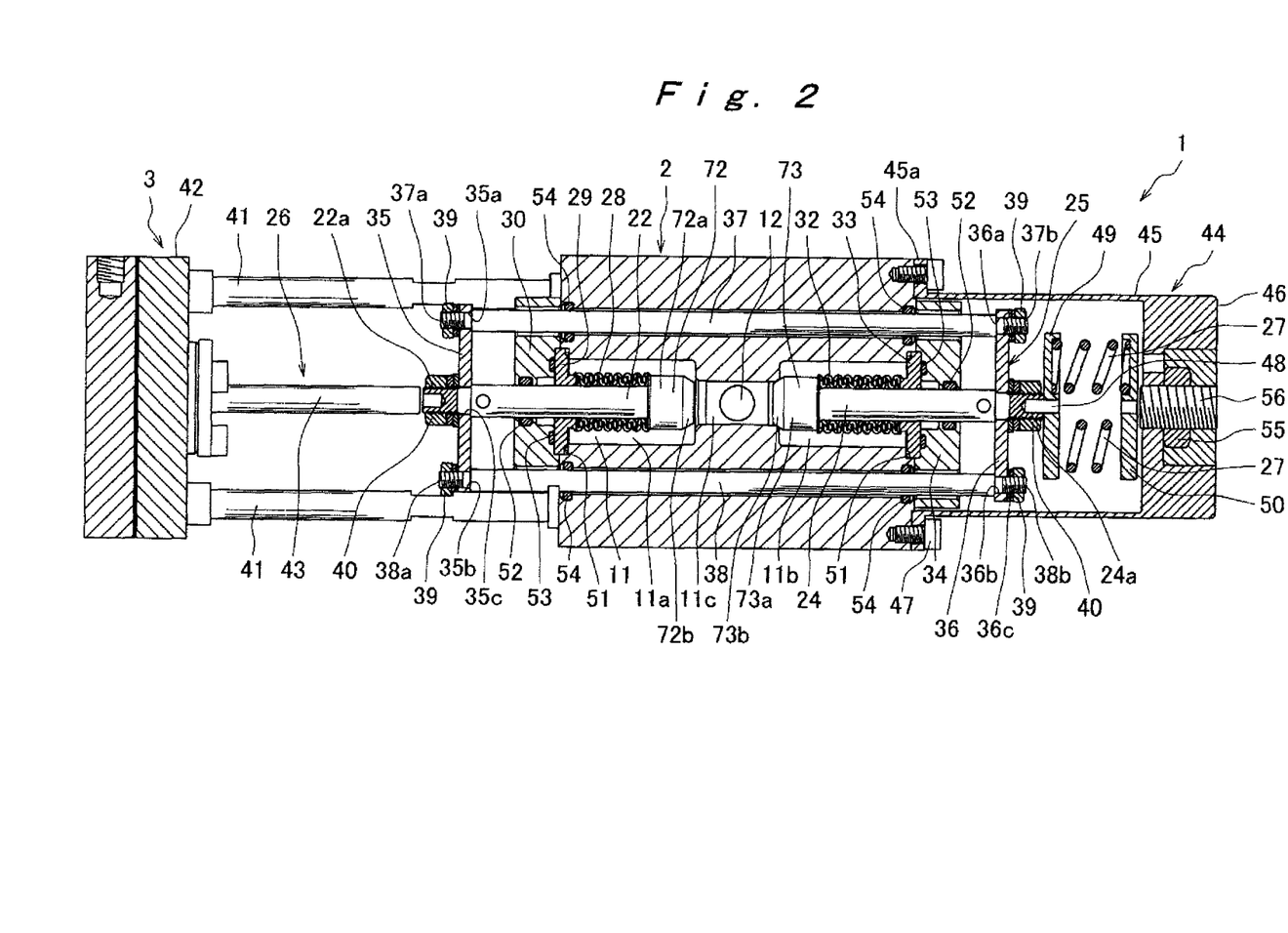
FIG. 2 is a longitudinal sectional view (partial cross-sectional view) showing the flow dividing valve in accordance with the first embodiment of the present invention, which shows a section rotated 90° from the section shown in FIG. 1.

FIGS. 1 and 2 show a flow dividing valve in accordance with a first embodiment of the present invention.

A flow dividing valve 1 of the first embodiment includes: a body 2 which has the shape of a rectangular parallelepiped and in which a required fluid passages (a main passage 11, an inlet passage 12, a first outlet passage 13, and a second outlet passage 14) are formed; and a valve element movement mechanism 3 which causes a first valve element 72 of the first embodiment and a second valve element 73 of the first embodiment to move integrally so as to close and open the fluid passages 11, 12, 13, and 14.

The flow dividing valve 1 causes a fluid flowing in through the inlet passage 12 to flow out through the two outlet passages 13 and 14 at a specified ratio, and adjusts the flow rate flowing out through each of the outlet passages 13 and 14 at a specified ratio.

The main passage 11 is linearly extended in the left-right direction and is composed of left and right large diameter portions 11a and 11b, and a small diameter portion 11c disposed at the center. The inlet passage 12 is disposed below the small diameter portion 11c of the main passage 11 so as to be orthogonal to the small diameter portion 11c. The first outlet passage 13 is disposed above the left large diameter portion 11a of the main passage 11 so as to be orthogonal to a right end portion of the large diameter portion 11a. The second outlet passage 14 is disposed above the right large diameter portion 11b of the main passage 11 so as to be orthogonal to a left end portion of the large diameter portion 11b.

The left large diameter portion 11a of the main passage 11 is open to a left surface of the body 2, whereas the right large diameter portion 11b of the main passage 11 is open to a right surface of the body 2.

At a lower portion of the inlet passage 12, an upper portion of the first outlet passage 13, and an upper portion of the second outlet passage 14, female screw portions 12a, 13a, and 14a are respectively formed, which serve as joint connection portions.

At the right end portion of the left large diameter portion 11a of the main passage 11, the first valve element 72 of the first embodiment is disposed to close and open the portion (a first seat 2a) between the left large diameter portion 11a of the main passage 11 and the small diameter portion 11c. In addition, at the left end portion of the right large diameter portion 11b of the main passage 11, the second valve element 73 of the first embodiment is disposed to close and open the portion (a second seat 2b) between the right large diameter portion 11b of the main passage 11 and the small diameter portion 11c.

The valve element movement mechanism 3 includes: a first valve stem 22 that is provided integrally with the first valve element 72 of the first embodiment and extends leftward from a left surface of the first valve element 72 of the first embodiment; a second valve stem 24 that is provided integrally with the second valve element 73 of the first embodiment and extends rightward from a right surface of the second valve element 73 of the first embodiment; a frame 25 that is connected to the first valve stem 22 and the second valve stem 24; an actuator 26 configured to move the frame 25 in the left-right direction; and a compression coil spring (urging member) 27 configured to urge the frame 25 leftward.

Each of the passages 11, 12, 13, and 14 are formed symmetrically with respect to the center line of the inlet passage 12. The valve elements 72 and 73 of the first embodiment have an identical shape with each other and are arranged symmetrically with respect to the center line of the inlet passage 12. The valve stems 22 and 24 have an identical shape with each other and are arranged symmetrically with respect to the center line of the inlet passage 12.

The body 2 is made of stainless steel (for example, SUS304). The portion (a disc-shaped packing) that comes into contact with the seat of each of the valve elements 72 and 73 of the first embodiment is also made of stainless steel (for example, SUS316L). The portions that come into contact with the seats 2a and 2b of the valve elements 72 and 73 of the first embodiment may be made of resins.

The left portion of the first valve stem 22 extends along the direction in which the first valve element 72 of the first embodiment is closed and opened, and protrudes leftward beyond the left surface of the body 2. The right portion of the second valve stem 24 extends along the direction in which the second valve element 73 of the first embodiment is closed and opened, and protrudes rightward beyond the right surface of the body 2.

A first bellows 28 is provided on the outer diameter side of the right portion of the first valve stem 22. The first bellows 28 has a right end that is fixed to the left surface of the first valve element 72 of the first embodiment, and has a left end that is fixed to a first bellows flange 29. The first bellows flange 29 is fitted to the first valve stem 22 from the left portion thereof, and is brought into contact with the left surface of the body 2. The first bellows flange 29 has a left surface that is brought into contact with a left plate 30 having a through hole through which the first valve stem 22 is inserted. The left surface of the first bellows flange 29 is fixed to the body 2 with bolts 31.

A second bellows 32 is provided on the outer diameter side of the left portion of the second valve stem 24. The second bellows 32 has a left end that is fixed to the right surface of the second valve element 73 of the first embodiment, and has a right end that is fixed to a second bellows flange 33. The second bellows flange 33 is fitted to the second valve stem 24 from the right portion thereof, and is brought into contact with the right surface of the body 2. The second bellows flange 33 has aright surface that is brought into contact with a right plate 34 having a through hole through which the second valve stem 24 is inserted. The right surface of the second bellows flange 33 is fixed to the body 2 with bolts 31.

Each of the bellows 28 and 32 deforms as each of the valve elements 72 and 73 of the first embodiment moves in the left-right direction, and prevents the fluid from leaking out.

The bellows 28 and 32 are made of metal, and is formed from stainless steel (SUS316L), a cobalt-based alloy, a nickel-based alloy, a copper-based alloy, or the like, for example. Examples of the bellows to be used as appropriate include a molded bellows that is manufactured by preparing a hollow sleeve with a metal material and then applying pressure from an inside thereof to shape a ridge portion that constitutes the outer diameter, and a welded bellows that is manufactured by joining pieces of disc-shaped thin metal sheet that is precisely corrugated and pressed, while welding its inner edge and outer edge alternately.

Between each of the bellows flange 29 and 33, and the body 2, a gasket 51 is disposed to prevent the fluid from leaking out.

In addition, between each of the plates 30 and 34, and each of the valve stems 22 and 24, an O-ring 52 is disposed. Also between each of the plates 30 and 34, and each of the bellows flanges 29 and 33, an O-ring 53 is disposed. These O-rings (seal members) 52 and 53 are disposed, not for the purpose of preventing the fluid from leaking out, but for the purpose of sealing the atmosphere at the time of assembly of the flow dividing valve 1 and preventing an outside atmosphere from entering the body 2.

The frame 25 is, as shown in FIG. 2, composed of: a left plate portion 35 having a middle portion that is attached to a left end portion of the first valve stem 22; a right plate portion 36 having a middle portion that is attached to a right end portion of the second valve stem 24; an upper shaft portion 37 that connects an upper edge of the left plate portion 35 and an upper edge of the right plate portion 36; and a lower shaft portion 38 that connects a lower edge of the left plate portion 35 and a lower edge of the right plate portion 36.

The upper shaft portion 37 and the lower shaft portion 38 penetrate the body 2, and an O-ring 54 is disposed between each of the left and right end portions of the body 2 and each of the shaft portions 37 and 38, to prevent the atmosphere from flowing in.

The plate portions 35 and 36 are provided, at their upper edge portions, with through holes 35a and 36a, respectively. Through these through holes 35a and 36a, left and right end portions of the upper shaft portion 37 are inserted, respectively. The upper shaft portion 37 is provided, at portions thereof that protrude beyond the plate portions 35 and 36, with male screws 37a and 37b, respectively. On these male screws 37a and 37b, nuts 39 are screwed whereby the upper edge portions of the plate portions 35 and 36 of the frame 25 are connected to the upper shaft portion 37. Similarly, the plate portions 35 and 36 are provided, at their lower edge portions, with through holes 35b and 36b, respectively. Through these through holes 35b and 36b, left and right end portions of the lower shaft portion 38 are inserted, respectively. The lower shaft portion 38 is provided, at portions thereof that protrude beyond the plate portions 35 and 36, with male screws 38a and 38b, respectively. On these male screws 38a and 38b, nuts 39 are screwed whereby the lower edge portions of the plate portions 35 and 36 of the frame 25 are connected to the lower shaft portion 38.

The left plate portion 35 is provided, at the middle portion thereof in a vertical direction, with a through hole 35c. Through this through hole 35c, the left end portion of the first valve stem 22 is inserted. The first valve stem 22 is provided, at a portion thereof that protrudes leftward beyond the left plate portion 35, with a male screw 22a. On this male screw 22a, a nut 40 is screwed whereby the left plate portion 35 of the frame 25 is connected to the first valve stem 22. Similarly, the right plate portion 36 is provided, at the middle portion thereof in a vertical direction, with a through hole 36c. Through this through hole 36c, the right end portion of the second valve stem 24 is inserted. The second valve stem 24 is provided, at a portion thereof that protrudes rightward beyond the right plate portion 36, with a male screw 24a. On this male screw 24a, a nut 40 is screwed whereby the right plate portion 36 of the frame 25 is connected to the second valve stem 24.

The body 2 is provided on the left surface thereof with four corner portions. Two bar-shaped spacers 41 extending leftward are provided on two corner portions that are located at diagonal positions, among the four corner portions. The actuator 26 is an air cylinder, and has a cylinder body 42 and a cylinder rod 43. The cylinder body 42 is supported by a left end portion of the spacer 41. The cylinder rod 43 extends rightward from the cylinder body 42 and moves in the left-right direction. The right end portion of the cylinder rod 43 faces the left end surface of the first valve stem 22.

At the right-hand side of the body 2, a casing 44 is provided that accommodates compression coil springs 27. The casing 44 includes a cylindrical peripheral wall 45 having a center line in the left-right direction, and a right wall 46 that closes a right end opening of the peripheral wall 45. The peripheral wall 45 is provided at a left end portion thereof with a flange portion 45a. The flange portion 45a is fixed to the right surface of the body 2 with bolts 47 each having a hexagonal hole. Around the center line, a plurality of (for example, three) compression coil springs 27 are disposed, each of which is held by a left spring-holder 49 and a right spring-holder 50. The left spring-holder 49 is fixed to the right end portion of the second valve stem 24 with a parallel pin 48. The right spring-holder 50 is received by the left surface of the peripheral wall 45 of the casing 44.

The compression coil springs 27 urge the second valve stem 24 and the frame 25 integral therewith leftward, whereby, when the actuator 26 is not in operation, the second valve element 73 of the first embodiment is configured to close the portion between the right large diameter portion 11b of the main passage 11 and the small diameter portion 11c. When the actuator 26 is in operation, the first valve stem 22 and the frame 25 integral therewith are moved rightward against the compression coil springs 27, whereby the second valve element 73 of the first embodiment is configured to open the portion between the right large diameter portion 11b of the main passage 11 and the small diameter portion 11c. Controlling the movement amount of the cylinder rod 43 allows control of the flow rate of a fluid flowing from the second outlet passage 14. That is, with one air cylinder (actuator) 26, it is possible to: control the opening degrees of the passages on the first outlet passage 13 side (for example, refrigerant circulation side) and the second outlet passage 14 side (for example, temperature control side); control a ratio (flow dividing ratio) between an amount of a fluid flowing out through the first outlet passage 13 and an amount of a fluid flowing out through the second outlet passage 14; and control an amount of a fluid flowing out through the first outlet passage 13 and an amount of a fluid flowing out through the second outlet passage 14 when an amount of a fluid (refrigerant) flowing in through the inlet passage 12 is constant.

On the right wall 46 of the casing 44, a nut 55 is fixed. On the nut 55, an adjustment screw 56 having a male thread on an outer peripheral surface thereof is screwed so as to be movable axially. The left end surface of the adjustment screw 56 is in contact with the right surface of the right spring-holder 50. By the adjustment screw 56 being screwed leftward or being screwed back rightward, the magnitude of the elastic force of the compression coil springs 27 is varied. With this configuration, a biasing force tor biasing the second valve stem 24 and the frame 25 integral therewith leftward is adjustable.

The flow dividing valve 1 is used in, for example, an apparatus such as a cooling device that requires a rapid temperature setting, for the purpose of performing flow dividing control for a refrigerant so as to control an amount of a refrigerant to be sent from an all-the-time circulating refrigerant piping system. In this case, a refrigerant flowing from one of the outlet passages (for example, second outlet passage 14) is used for temperature control, whereas a refrigerant flowing from the other of the outlet passages (for example, the first outlet passage 13) is circulated to be used repeatedly. The temperature of an portion that serves as a temperature control apparatus is monitored, and the flow rate of the refrigerant flowing through the apparatus is supplied to the actuator 26 actuated with air using an electropneumatic change regulator so as to perform control.

Figure 3:
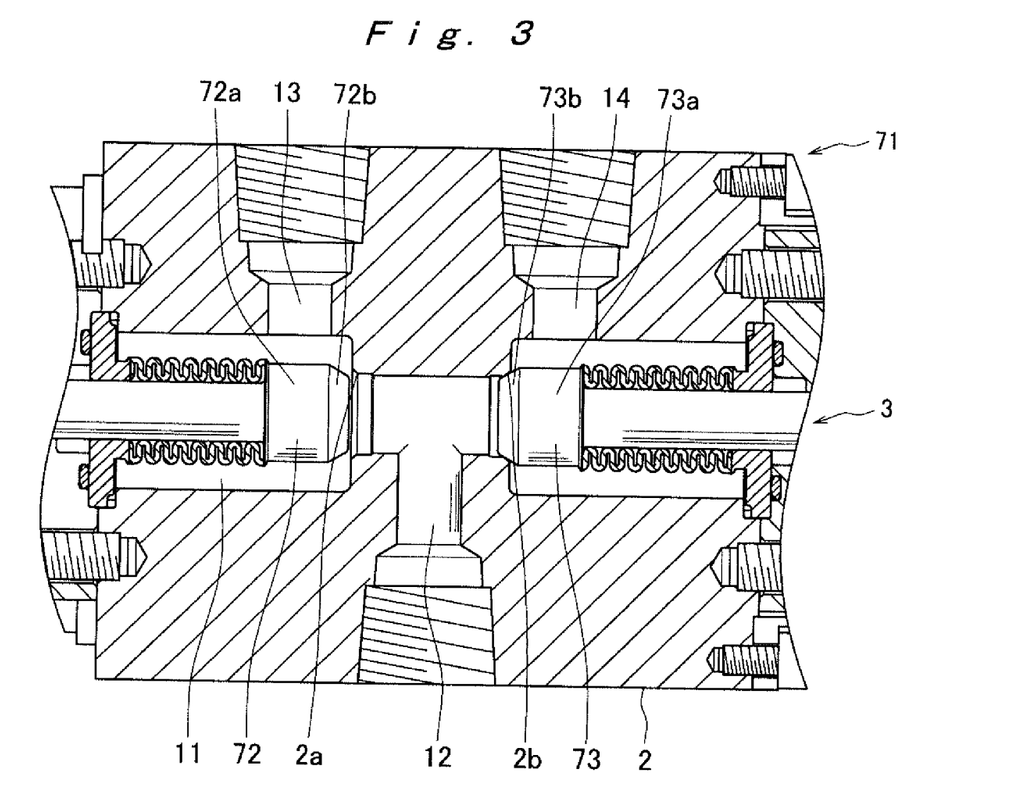
FIG. 3 is a view illustrating the principal components of the flow dividing valve shown in FIG. 1.

As shown in FIG. 3 in an enlarged manner, the valve elements 72 and 73 of the first embodiment are composed of: columnar portions 72*a* and 73*a*; and tapered portions 72*b* and 73*b* contiguous therewith, respectively.

Figure 7:
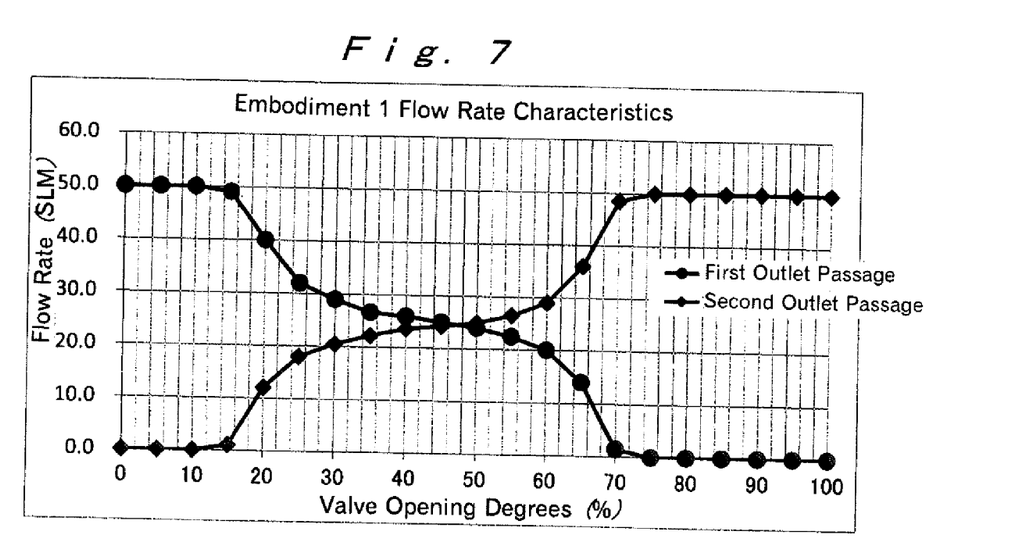
FIG. 7 shows flow rate characteristics of the flow dividing valve in accordance with the first embodiment.

FIG. 7 shows flow rate characteristics of the flow dividing valve 1 in accordance with the first embodiment. Comparison between FIG. 7 and FIG. 11 reveals that the flow dividing valve 1 of the first embodiment has a flow rate that gradually changes associated with the change of the valve opening degree.

Specifically stated, in order to actualize a cooling device that requires a rapid temperature setting, control of flow rate of the refrigerant with good responsiveness and high accuracy is required for the temperature setting. With the flow dividing valve 1 of the first embodiment, because the bellows 28 and 32 are used to prevent the fluid from leaking out, the stroke (actuation lift) for movement of the valve elements 72 and 73 of the first embodiment is increased as compared to the case where a diaphragm is used, whereby the accuracy of controlling the flow dividing ratio is improved.

Although the flow rate characteristics shown in FIG. 7 is greatly improved as compared to the flow rate characteristics shown in FIG. 11, there is room for improvement in the flow dividing valve in accordance with the present embodiment because a problem of failing to perform linear control at around the center still exists. However, if the initial operation does not involve turning on and off abruptly, this flow dividing valve may be used with no problems, for an apparatus that does not require accurate linear control at around the center.

In the above-described flow dividing valve 1, because the bellows 28 and 32 are made of metal (for example, made of stainless steel), excellent durability is achieved when being used at a repetitive fatigue limit stress or lower within a working pressure and a working stroke.

When a low-temperature (for example, −60 degrees centigrade) refrigerant is to be used, there is a possibility of causing a problem that an atmosphere at a portion where the valve element slides condenses to freeze. However, in the present embodiment, because sealing is achieved using the O-rings 52 and 53 whereby the atmosphere is sealed at the time of assembly, the possible problem that an atmosphere at portions where the valve elements 22 and 24 slide condenses to freeze is prevented from occurring.

Embodiment 2

The present invention of a second embodiment relates to a flow dividing valve in accordance with a second aspect of the present invention. The flow dividing valve 1 of this second embodiment has the same configuration as that of the first embodiment except that the structure of the valve elements 72 and 73 of the first embodiment are different from that of valve elements 21 and 23 of the second embodiment. The configuration of the second embodiment that is the same as that of the first embodiment, therefore, will not be described.

Figure 4:
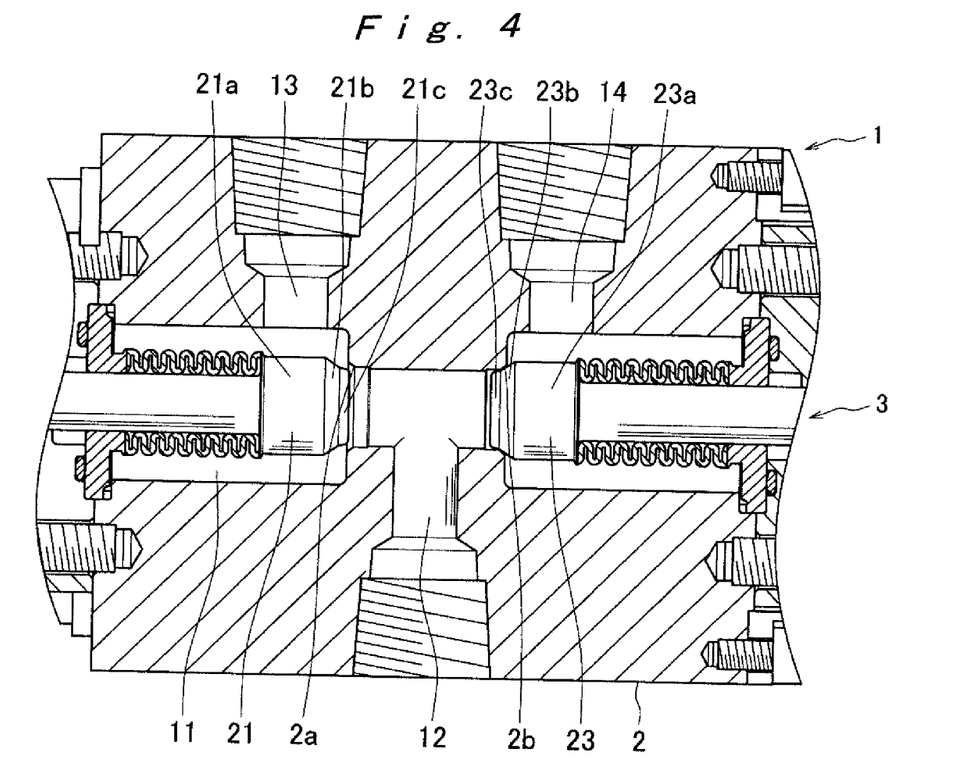
FIG. 4 is a longitudinal sectional view showing a flow dividing valve in accordance with a second embodiment of the present invention, which corresponds to FIG. 3.

FIG. 4 shows valve elements 21 and 23 of the second embodiment in an enlarged manner. The valve elements 21 and 23 of the second embodiment are composed of: columnar portions 21*a* and 23*a*; first tapered portions 21*b* and 23*b* contiguous with the columnar portions 21*a* and 23*a*, respectively; and second tapered portions 21*c* and 23*c* contiguous with the first tapered portions 21*b* and 23*b*, respectively. Cone angles of the second tapered portions 21*c* and 23*c* are smaller than cone angles of the first tapered portions 21*b* and 23*b*, respectively.

Figure 5:
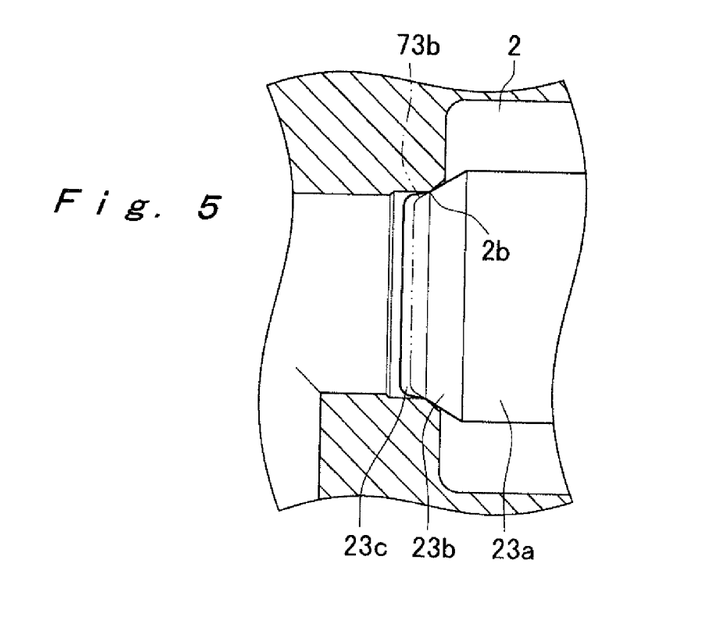
FIG. 5 is an enlarged vertical cross-sectional view showing a valve element of the first embodiment and a valve element of the second embodiment, for comparison.

FIG. 5 shows a difference between the valve element 73 of the first embodiment that is shown by a two-dot chain line and the valve element 23 of the second embodiment that is shown by a solid line. The valve element 73 of the first embodiment has a tapered portion 73*b* that is brought into close contact with the seat 2*b* whereby a fully closed state is obtained. In contrast, the valve element 23 of the second embodiment has a first tapered portion 23*b* and a second tapered portion 23*c* each having an outer peripheral surface. A boundary (flexion point) portion between the first tapered portion 23*b* and the second tapered portion 23*c* has a diameter that is equal to that of the valve seat 2*b*. In the second embodiment, the boundary (flexion point) portions between the outer peripheral surfaces of the first tapered portions 21*b* and 23*b* and the outer peripheral surfaces of the second tapered portions 21*c* and 23*c* are brought into close contact with the corresponding seats 2*a* and 2*b*, respectively, whereby a fully closed state is obtained.

Figure 6:
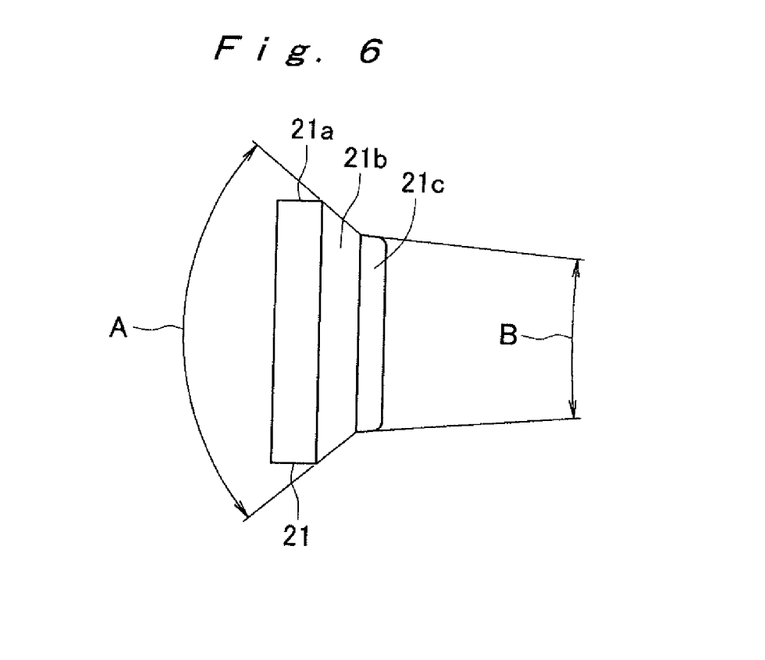
FIG. 6 is a view showing, in an enlarged manner, the shape of the valve element of the second embodiment.

The shape of the second valve element 23 of the second embodiment is the same as that of the first valve element 21 of the second embodiment. Cone angles A and B of the tapered portions 21*b*, 23*b*, 21*c*, and 23*c* are set as appropriate so as to optimize Cv values, as described below. In FIG. 6, preferably, a cone angle A of the first tapered portions 21*b* and 23*b* is set within a range of, for example, 40 to 80 degrees (where the cone angle A is set so as to be smaller than the angle of the seats 2*a* and 2*b*), and a cone angle B of the second tapered portions 21*c* and 23*c* are set within a range of, for example, 1 to 40 degrees. It should be noted that the cone angle B may be 0 degrees (the second tapered portion having a columnar shape).

Because the second tapered portions 21*c* and 23*c* are provided which have smaller cone angles, the change in an area of the opening associated with the movement of the valve elements 21 and 23 of the second embodiment corresponds to a change in an area of the opening formed between each of the second tapered portions 21*c* and 23*c* and the seats 2*a* and 2*b*, respectively. Such a change is more gradual as compared to the case of the valve elements 72 and 73 of the first embodiment in which the change in an area of the opening associated with the movement of the valve elements 72 and 73 of the first embodiment corresponds to a change in an area of the opening formed between each of the tapered portions 72b and 73b and the seats 2a and 2b, respectively.

Figure 8:
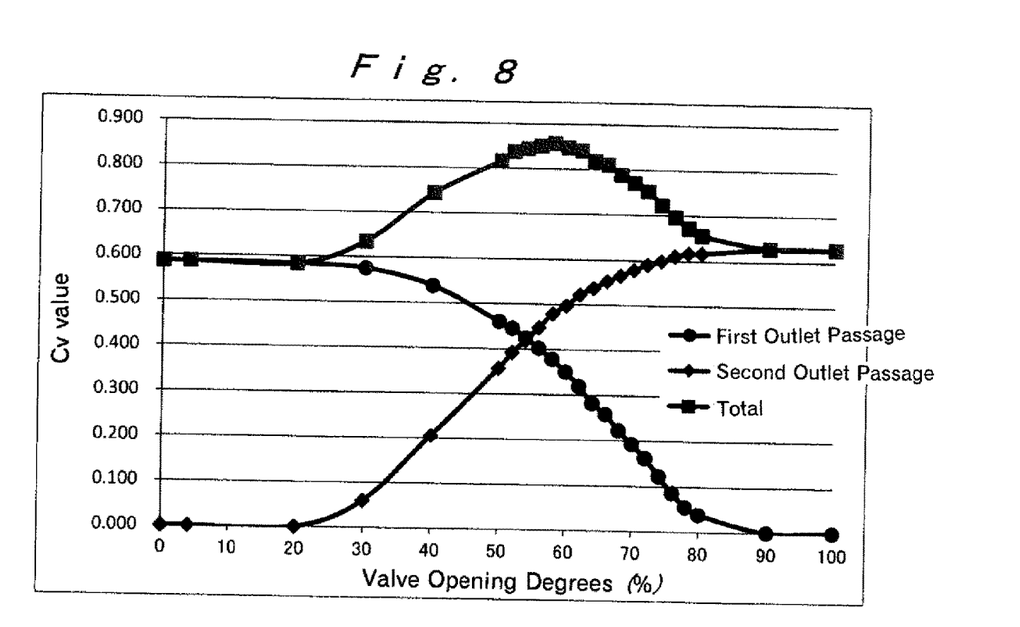
FIG. 8 shows Cv values of the flow dividing valve in accordance with the first embodiment.

FIG. 8 shows results of the analysis of Cv values, for the flow dividing valve 1 in which the valve elements 72 and 73 of the first embodiment are used. In FIG. 8, the horizontal axis represents the opening degrees (%), and the ordinate axis represents: Cv values for the first outlet passage side; Cv values for the second outlet passage side; and the total Cv values of the Cv values for the first outlet passage side and the Cv values for the second outlet passage side. Although the horizontal axis is represented using the opening degrees with respect to the valve seats 2a and 2b of the valve elements 72 and 73 of the first embodiment for convenience, actually it is an operating pressure (0 to 0.5 MPa) of the actuator that actuates the valve elements 72 and 73 of the first embodiment. Therefore, the Cv value rises up at the opening degree of 20% (operational pressure of 0.1 MPa). Non-reaction regions of the Cv values in which the opening degree is 0 to 20% (operational pressure of 0 to 0.1 MPa) and the opening degree is 80 to 100% (operational pressure of 0.4 to 0.5 MPa) can be decreased by changing the spring load or the output of the actuator. But in the present embodiment, because the non-reaction is a trade-off for the occurrence of the seat leak, the non-reaction regions remain. In FIG. 8 which shows the opening degrees and the Cv values in accordance with the first embodiment, the maximum value of the Cv value among the Cv values on the first outlet passage side and the Cv values on the second outlet passage side is on the order of 0.6, whereas the total Cv value at around the intermediate opening degree is greater than 0.6. This reveals that the amounts of fluids flowing out though the first outlet passage 13 and the second outlet passage 14 both increase. With the above-described findings and the flow rate characteristics shown in FIG. 7 being combined, it is found that because the total Cv value at around the intermediate opening degree is greater than the maximum value of the Cv value on each of the outlet passage sides, the flow rate characteristics at around the intermediate opening degree are flat and there exists a range where the flow dividing control is difficult.

Figure 9:
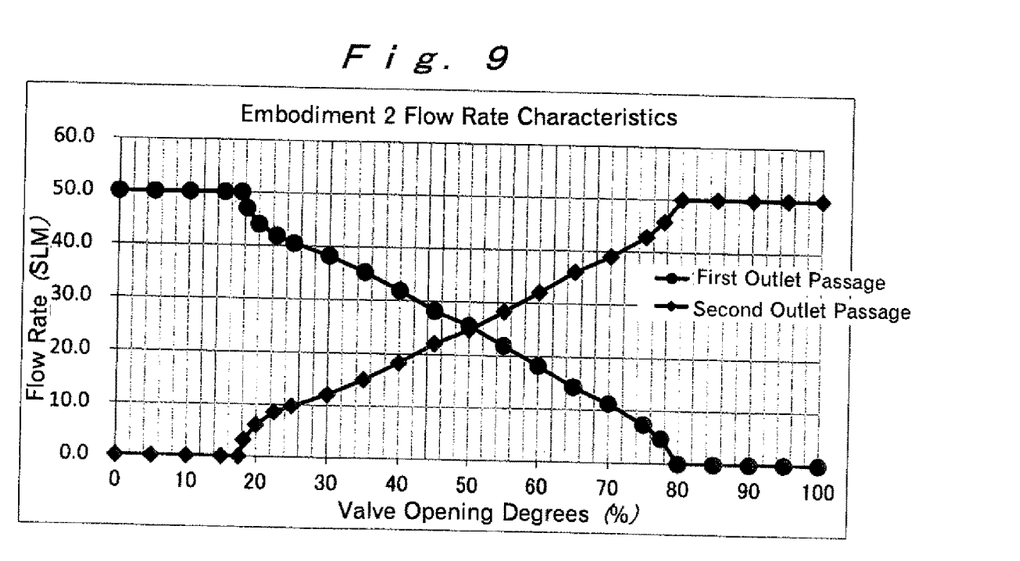
FIG. 9 shows flow rate characteristics of the flow dividing valve in accordance with the second embodiment.
Figure 10:
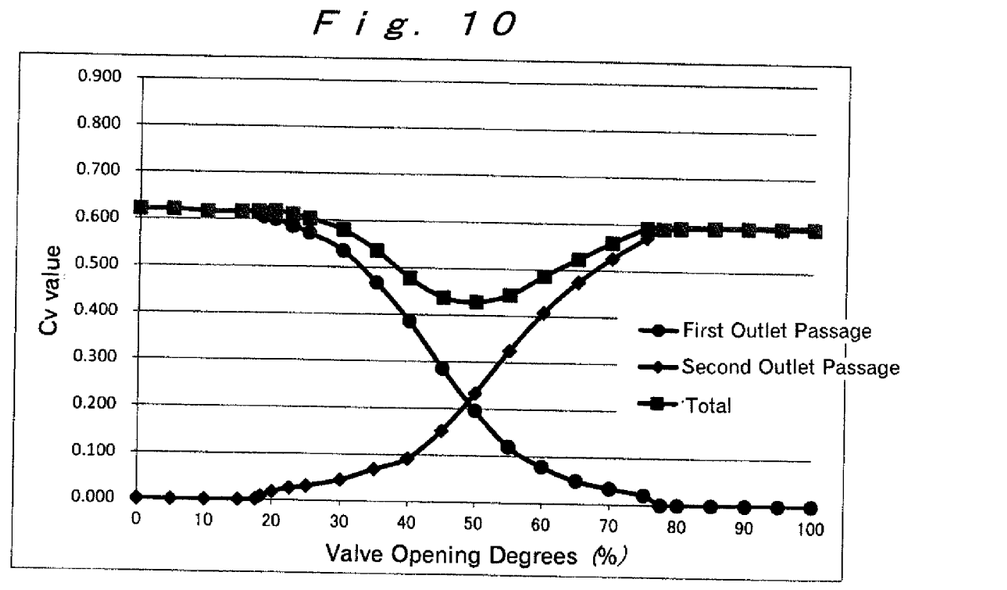
FIG. 10 shows Cv values of the flow dividing valve in accordance with the second embodiment.

Graphs of FIG. 9 and FIG. 10 show the flow rate characteristics and the Cv values, respectively, for the flow dividing valve 1 using the valve elements 21 and 23 in accordance with the second embodiment. FIG. 9 corresponds to FIG. 7, whereas FIG. 10 corresponds to FIG. 8.

The graph in FIG. 10 reveals that using the valve elements 21 and 23 of the second embodiment causes the total Cv value at around the intermediate opening degree of the flow dividing valve 1 to be less than 0.6. In this respect, the situation differs from the case where the valve elements 72 and 73 of the first embodiment are used in accordance with the first embodiment that is illustrated by the graph shown in FIG. 8 in which the Cv value at around the intermediate opening degree is greater than 0.6.

The graph in FIG. 9 reveals that, because the flow dividing valve 1 using the valve elements 21 and 23 of the second embodiment uses the Cv values shown in FIG. 10, the flow rate changes approximately linearly and proportionally to the opening degree. The amount of change in the flow rate characteristics is greater at around the intermediate opening degree and the amount of change in the flow rate characteristics is smaller at both opposite sides (rise up portions), as compared to the case where the valve elements 72 and 73 of the first embodiment are used as illustrated by the graph in FIG. 8. As such, using the valve elements 21 and 23 of the second embodiment overcomes the problem that the flow rate characteristics is almost flat at around the intermediate opening degree (the opening degree of 30 to 60%) and changes somewhat abruptly at both sides (the opening degree of 15 to 25% and the opening degree of 60 and 70%) as shown in FIG. 7.

The Cv value is one of the coefficients of capacity of the valve and is determined using a prescribed expression. The analysis as described above reveals that, regarding the sum of the Cv value on the first outlet passage side and the Cv value on the second outlet passage side, the sum of the Cv values of the both outlet passages in the state of the intermediate opening degree is not greater than the sum of the Cv values of both outlet passages in the state of the 0% opening degree and in the state of the 100% opening degree, whereby the flow rate changes approximately linearly and proportionally to the opening degree.

The Cv value has a relationship of being proportional to the area of the opening. The Cv value may be replaced with the area of the opening that is determined by using the inner diameter of the seats 2a and 2b and the outer diameter of the tapered portions 21b, 21c, 23b, and 23c. Specifically stated, regarding the sum of: the area of the opening on the first outlet passage side formed between the first seat 2a and the first valve element 21 of the second embodiment; and the area of the opening on the second outlet passage side formed between the second seat 2b and the second valve element 23 of the second embodiment, the sum of the areas of the openings in the state of the intermediate opening degree is not greater than the sum of the areas of the openings in the state of the 0% opening degree and in the state of the 100% opening degree, whereby the flow rate changes approximately linearly and proportionally to the opening degree.

That is, with the flow dividing valve 1 in accordance with the second embodiment, because the flow rate changes approximately linearly and proportionally to the opening degree, flow rate control may be performed accurately even in any range from the flow rate of being zero to that at the maximum.

It should be noted that, not only the valve elements 21 and 23 of the second embodiment may be replaced with the valve elements 72 and 73 of the first embodiment of the flow dividing valve as shown in FIG. 1 and FIG. 2, but also the valve elements 21 and 23 of the second embodiment may be replaced with valve elements used in a variety of flow dividing valves, as a matter of course.

INDUSTRIAL APPLICABILITY

In the present invention, the flow rate control of the flow dividing valve is performed with excellent accuracy, which contributes to improvement of the accuracy for temperature control or the like that is performed using the flow dividing valve.

The invention claimed is:
1. A flow dividing valve including:
a body in which a main passage, an inlet passage that is in communication with the main passage, a first outlet passage that is in communication with the main passage, and a second outlet passage that is in communication with the main passage are formed;
a first seat disposed at a portion of the main passage, the portion leading to the first outlet passage;
a second seat disposed at a portion of the main passage, the portion leading to the second outlet passage;
a first valve element that is brought into contact with and is separated from the first seat to close and open the portion that leads to the first outlet passage, respectively;

a second valve element that is brought into contact with and is separated from the second seat to close and open the portion that leads to the second outlet passage, respectively; and a valve element movement mechanism that moves either one of the first valve element and the second valve element to an opening side and that moves the other of the first valve element and the second valve element to a closing side in an interlocked manner, wherein the main passage has two large diameter portions and a small diameter portion located between the large diameter portions, with the inlet passage being in communication with the small diameter portion, the first outlet passage being in communication with one of the large diameter portions, and the second outlet passage being in communication with the other of the large diameter portions, and the valve element movement mechanism comprises:
- a first valve stem that has one end portion to which the first valve element configured to close and open an area between the one of the large diameter portions and the small diameter portion of the main passage is fixed, and that extends along a direction in which the first valve element is closed and opened;
- a second valve stem that has one end portion to which the second valve element configured to close and open an area between the other of the large diameter portions and the small diameter portion of the main passage is fixed, and that extends along a direction in which the second valve element is closed and opened;
- a first bellows having one end portion that is fixed to a first bellows flange and the other end portion that is fixed to the first valve element;
- a second bellows having one end portion that is fixed to a second bellows flange and the other end portion that is fixed to the second valve element;
- a frame that is disposed outside the main passage and that is connected to the first valve stem and the second valve stem; and
- an actuator configured to move the frame in the directions in which the first valve element and the second valve element are closed and opened, wherein the flow dividing valve includes a plate that has a through hole through which the first valve stem or the second valve stem is to be inserted and that causes the first bellows flange or the second bellows flange to be pressed against the body, and a seal member is provided between the plate, and the first valve stem or the second valve stem.

2. The flow dividing valve according to claim 1, wherein the actuator is a cylinder having a cylinder body and a cylinder rod, and the cylinder body is fixed to the body of the flow dividing valve via a spacer.

3. The flow dividing valve according to claim 1, wherein the first valve element has the same shape as the second valve element.

4. The flow dividing valve according to claim 1, wherein the first valve element and the second valve element each have a surface that is brought into contact with and is separated from the first seat and the second seat, respectively, and the surface has a tapered shape.

5. The flow dividing valve according to claim 1, wherein flow rate characteristics of a fluid that flows between the first valve element and the first seat and a fluid that flows between the second valve element and the second seat are linear flow characteristics.

6. A flow dividing valve including:
a body in which a main passage, an inlet passage that is in communication with the main passage, a first outlet passage that is in communication with the main passage, and a second outlet passage that is in communication with the main passage are formed;
a first seat disposed at a portion of the main passage, the portion leading to the first outlet passage;
a second seat disposed at a portion of the main passage, the portion leading to the second outlet passage;
a first valve element that is brought into contact with and is separated from the first seat to close and open the portion that leads to the first outlet passage, respectively;
a second valve element that is brought into contact with and is separated from the second seat to close and open the portion that leads to the second outlet passage, respectively; and
a valve element movement mechanism that moves either one of the first valve element and the second valve element to an opening side and that moves the other of the first valve element and the second valve element to a closing side in an interlocked manner, and
the flow dividing valve configured to be switchable among:
- a state of a 0% opening degree in which a position of the first valve element with respect to the first seat is at a fully open position and a position of the second valve element with respect to the second seat is at a fully closed position;
- a state of a 100% opening degree in which the position of the first valve element with respect to the first seat is at a fully closed position and the position of the second valve element with respect to the second seat is at a fully open position; and
- a state of an intermediate opening degree in which the position of the first valve element with respect to the first seat is at a required open position and the position of the second valve element with respect to the second seat is also at a required open position, wherein, regarding a sum of:
- a Cv value on a side of the first outlet passage formed between the first seat and the first valve element; and
- a Cv value on a side of the second outlet passage formed between the second seat and the second valve element;

the sum in the state of the intermediate opening degree is not greater than the sum in the state of the 0% opening degree, and is not greater than the sum in the state of the 100% opening degree, wherein each valve element includes:
- a first tapered portion that has a specified cone angle and that is brought into contact with the corresponding seat when the valve element is fully closed; and
- a second tapered portion that has a cone angle smaller than that of the first tapered portion and that is contiguous with a distal end side of the first tapered portion.

7. The flow dividing valve according to claim 6, wherein the main passage has two large diameter portions and a small diameter portion located between the large diameter portions, with the inlet passage being in communication with the small diameter portion, the first outlet passage being in communication with one of the large diameter portions, and the second outlet passage being in communication with the other of the large diameter portions, and the valve element movement mechanism includes:
- a first valve stem that has one end portion to which the first valve element configured to close and open an area between the one of the large diameter portions and the small diameter portion of the main passage is fixed, and that extends along a direction in which the first valve element is closed and opened;
- a second valve stem that has one end portion to which the second valve element configured to close and open an area between the other of the large diameter portions and the small diameter portion of the main passage is fixed, and that extends along a direction in which the second valve element is closed and opened;
- a first bellows having one end portion that is fixed to a first bellows flange and the other end portion that is fixed to the first valve element;
- a second bellows having one end portion that is fixed to a second bellows flange and the other end portion that is fixed to the second valve element;
- a frame that is disposed outside the main passage and that is connected to the first valve stem and the second valve stem; and
- an actuator that is actuated with air and configured to move the frame in the directions in which the first valve element and the second valve element are closed and opened.

* * * * *